US012382334B2

(12) United States Patent
Wu et al.

(10) Patent No.: US 12,382,334 B2
(45) Date of Patent: Aug. 5, 2025

(54) METHOD AND APPARATUS FOR RADIO LINK FLOW CONTROL

(71) Applicant: LENOVO (BEIJING) LIMITED, Beijing (CN)

(72) Inventors: Lianhai Wu, Beijing (CN); Joachim Lohr, Wiesbaden (DE); Prateek Basu Mallick, Dreieich (DE); Jie Shi, Beijing (CN); Jing Han, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 468 days.

(21) Appl. No.: 17/608,619

(22) PCT Filed: May 8, 2019

(86) PCT No.: PCT/CN2019/085967
§ 371 (c)(1),
(2) Date: Nov. 3, 2021

(87) PCT Pub. No.: WO2020/223919
PCT Pub. Date: Nov. 12, 2020

(65) Prior Publication Data
US 2022/0232414 A1    Jul. 21, 2022

(51) Int. Cl.
*H04W 28/02*        (2009.01)
*H04W 80/02*        (2009.01)
(52) U.S. Cl.
CPC ... *H04W 28/0278* (2013.01); *H04W 28/0284* (2013.01); *H04W 80/02* (2013.01)

(58) Field of Classification Search
CPC ......... H04W 28/0278; H04W 28/0284; H04W 80/02; H04W 84/047; H04L 47/267; H04L 47/30; H04B 7/26
See application file for complete search history.

(56) References Cited

U.S. PATENT DOCUMENTS 6,628,613 B1    9/2003  Joung et al.
7,843,817 B2 *  11/2010 Gong ................... H04L 47/122
                                                     370/229
(Continued)

FOREIGN PATENT DOCUMENTS

CN       1705308 A     12/2005
CN      101009652 A     8/2007
(Continued)

OTHER PUBLICATIONS

International Searching Authority, "Written Opinion of the International Searching Authority," PCT/CN2019/085967, Jan. 20, 2020, pp. 1-4.
(Continued)

*Primary Examiner* — Afshawn M Towfighi
(74) *Attorney, Agent, or Firm* — Kunzler Bean & Adamson

(57) ABSTRACT

The present disclosure relates to methods and apparatuses. According to some embodiments of the disclosure, a method includes: receiving, at a communication device, a configuration message including a threshold to configure the communication device; and transmitting, from the communication device, a congestion indication if an occupied buffer size of the communication device is equal to or greater than the threshold.

20 Claims, 11 Drawing Sheets

(56) References Cited

U.S. PATENT DOCUMENTS

| | | | |
|---|---|---|---|
| 11,558,298 B2* | 1/2023 | Leib | H04L 49/25 |
| 2007/0036105 A1* | 2/2007 | Chun | H04W 16/14 |
| | | | 370/329 |
| 2011/0222406 A1* | 9/2011 | Persson | H04L 47/30 |
| | | | 370/236 |
| 2016/0234851 A1* | 8/2016 | Zhang | H04W 72/54 |
| 2018/0027474 A1 | 1/2018 | Wang et al. | |
| 2021/0119920 A1* | 4/2021 | Tesanovic | H04L 47/30 |
| 2021/0127293 A1* | 4/2021 | Hong | H04W 28/0278 |
| 2021/0185755 A1* | 6/2021 | Kim | H04W 68/005 |
| 2022/0053370 A1* | 2/2022 | Zhuo | H04W 28/12 |
| 2022/0232414 A1* | 7/2022 | Wu | H04L 47/267 |

FOREIGN PATENT DOCUMENTS

| | | |
|---|---|---|
| CN | 101047425 A | 10/2007 |
| CN | 101998495 A | 3/2011 |
| EP | 3637706 A1 | 4/2020 |
| WO | 2007079640 A1 | 7/2007 |
| WO | 2018225988 A1 | 12/2018 |

OTHER PUBLICATIONS

Sequans Communications, L2 buffer congestion handling, 3GPP TSG-RAN WG2 #101, R2-1803677, Feb. 26-Mar. 2, 2018, pp. 1-4, Athens, Greece.

* cited by examiner

700A

| | | |
|---|---|---|
| 704B | 702B-1 | Oct 1 |
| 702B-1 | 702B-2 | Oct 2 |
| 702B-2 | 702B-3 | Oct 3 |
| 702B-3 | 706B | Oct 4 |

| | | |
|---|---|---|
| 704D | 702D-1 | Oct 1 |
| 702D-1 | 708D-1 | Oct 2 |
| 702D-2 | | Oct 3 |
| 708D-2 | 706D | Oct 4 |

FIG. 7D

METHOD AND APPARATUS FOR RADIO LINK FLOW CONTROL

TECHNICAL FIELD

The present disclosure generally relates to wireless communication technology, and more particularly to radio link flow control in a wireless communication system.

BACKGROUND

A wireless communication system may include a base station (hereinafter referred to as "BS") which can be in communication with a user equipment (hereinafter referred to as "UE"). UE may include a mobile device (e.g., a cell phone, a tablet, a laptop, an internet-of-things (IoT) device, etc.). Quality of a communication link or channel between a BS and an UE may deteriorate due to various factors, for example but is not limited to, blockage by building(s), relatively long distance between the BS and the UE, etc. One of several solutions to resolve this problem may include deployment of relay nodes (hereinafter referred to as "RNs") in the wireless communication system to enhance and/or expand coverage of the BS, as disclosed in the 3rd Generation Partnership Project (3GPP).

A BS, which communicates with an UE through one or more RNs, can be called as a donor BS. These RNs together with the donor BS may form a backhaul link allowing the UE to reach the donor BS through one or more RNs. Signals from the UE may also be simply transmitted from one RN directly to the donor BS. An Integrated Access and Backhaul (IAB) architecture, which may be evolved from RNs deployment in 3GPP, is being developed to support multi-hop relay in a New Radio (NR) communication network.

Nevertheless, an RN may experience congestion under certain conditions, and therefore a new solution is required to indicate congestion and control the congestion in the communication network.

SUMMARY OF THE DISCLOSURE

Some embodiments of the present disclosure provides a method, including: receiving, at a communication device, a configuration message including a threshold to configure the communication device; and transmitting, from the communication device, a congestion indication if an occupied buffer size of the communication device is equal to or greater than the threshold.

Another embodiment of the present disclosure provides a method, including: receiving, from a communication device, a congestion indication via a medium access control (MAC) unit or a message in adaptation layer.

Yet another embodiment of the present disclosure provides an apparatus. According to some embodiments of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

FIG. 7B illustrates an exemplary MAC control element according to some embodiments of the present disclosure;

FIG. 7D illustrates an exemplary MAC control element according to some embodiments of the present disclosure.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
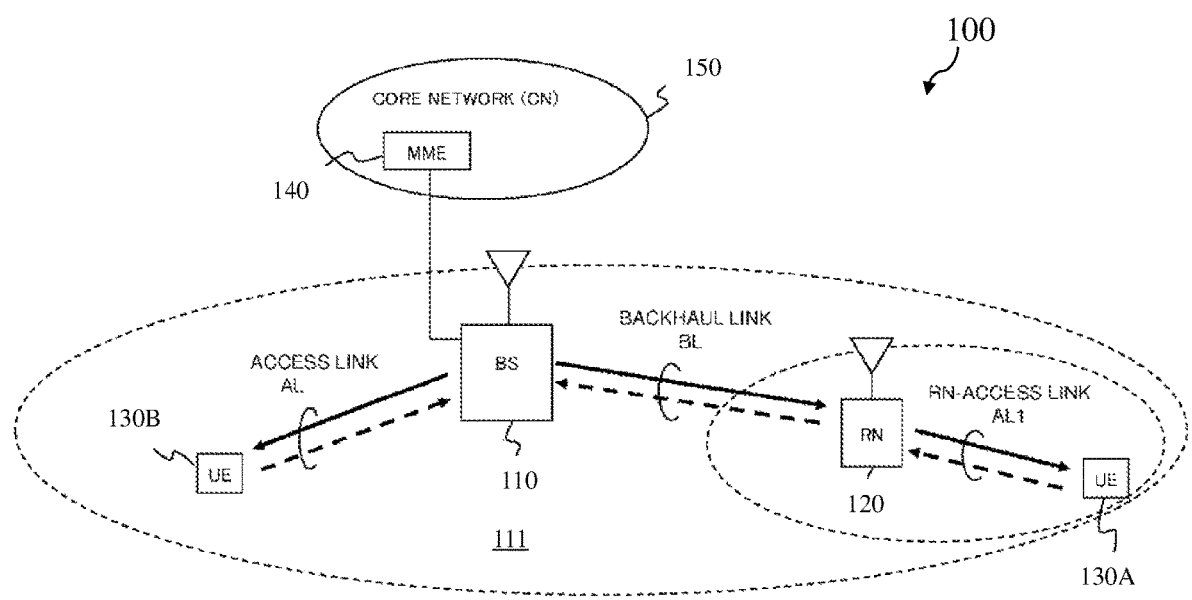
FIG. 1 illustrates a schematic wireless communication system according to some embodiments of the present disclosure.

FIG. 1 illustrates a wireless communication system 100 according to some embodiments of the present disclosure.

Referring to FIG. 1, a wireless communication system 100 may include some nodes (e.g., BS 110 and RN 120) and some UEs (e.g., UE 130A and UE 130B). Although, for simplicity, merely two nodes are illustrated in FIG. 1, it is contemplated that wireless communication system 100 may also include more or fewer nodes in some other embodiments of the present disclosure. Although, for simplicity, merely two UEs are illustrated in FIG. 1, it is also contemplated that wireless communication system 100 may include more or fewer UEs in some other embodiments of the present disclosure.

The BS 110, which communicates with a Core Network (CN) 150, may operate or work under the control of a Mobility Management Entity (MME) 140. The core network may include a Home Subscriber Server (HSS) (not illustrated in FIG. 1), which communicatively coupled with the MME. The BS 110 may operate, for example based on a standard protocol such as Long-Term Evolution (LTE), LTE-Advanced (LTE-A), New Radio (NR), or other suitable protocol(s). For example, the BS 110 may include an eNB or a gNB, and may define one or more cells (e.g., cell 111). The RN 120 may include a relay node or an integrated access and backhaul node (IAB node). UE 130A may include, for example, but is not limited to, a computing device, a wearable device, a mobile device, an IoT device, etc. UE 130B may include a device that is the same or similar to UE 130A. UE 130B may also include a device different from UE 130A. Persons skilled in the art should understand that as technology develops and advances, the terminologies described in the present disclosure may change, but should not affect or limit the principles and spirit of the present disclosure.

BS 110 (or Donor BS) may establish radio connections with UE 130B and RN 120 through an Access Link (AL) and a Backhaul Link (BL) based on protocol Layer-1 (Physical Layer) to Layer-3 (Radio Resource Control (RRC) Layer), respectively.

In some embodiments of the present disclosure, RN 120 may establish a radio connection with UE 130A through an RN-access link (AL1) based on protocol Layer-1 to Layer-3. In some other embodiments of the present disclosure, the RN 120 may establish a radio connection with the UE 130A through the AL1 based on protocol Layer-1 to Layer-2.

Although FIG. 1 merely shows that the Donor BS 110 is connected to a single UE for simplicity, it is contemplated that the Donor BS 110 may provide or establish connections with multiple UEs. Similarly, although FIG. 1 merely shows that the RN 120 is connected to a single UE for simplicity, it is contemplated that the RN 120 may also provide or establish connections with multiple UEs.

Deployment of RN(s) helps to enhance and/or extend coverage of a BS by a backhaul link. Evolved Universal Terrestrial Radio Access Network (E-UTRAN) supports relaying by having an RN wirelessly connect to an eNB serving the RN, called Donor eNB (DeNB), via a modified version of the Evolved Universal Terrestrial Radio Access (E-UTRA) radio interface, i.e., the BL, also referred to as the Un interface. The radio interface that provides radio protocol connection between RN and the UE is referred to as the Uu interface. Relay function and use of RN/DeNB entities in a network is transparent to the operations of the connected UEs.

As mentioned above, 3GPP is envisioning an IAB architecture for 5G (NR) communication networks supporting multi-hop relays. In other words, an IAB node may hop through one or more IAB nodes before reaching the IAB Donor. A single hop may be considered a special instance of multiple hops. Multi-hop backhauling is relatively beneficial because it provides a relatively greater coverage extension compared to single-hop backhauling. In a relatively high frequency radio communication system (e.g., radio signals transmitted in frequency bands over 6 GHz), relatively narrow or less signal coverage may benefit from multi-hop backhauling techniques. Multi-hop backhauling further enables backhauling around obstacles (e.g., buildings in urban environments for in-clutter deployments).

The maximum number of hops in RN deployment may depend on various factors, for example but is not limited to, frequency, cell density, propagation environment, traffic load, or other factors. These factors are expected to change over time. Therefore, from the perspective of network architecture, it is desirable to ensure the flexibility in hop count. On the other hand, as the number of hops increases, scalability issues may arise. For example, performance may degrade or network load may increase to an unacceptable level.

Figure 2:
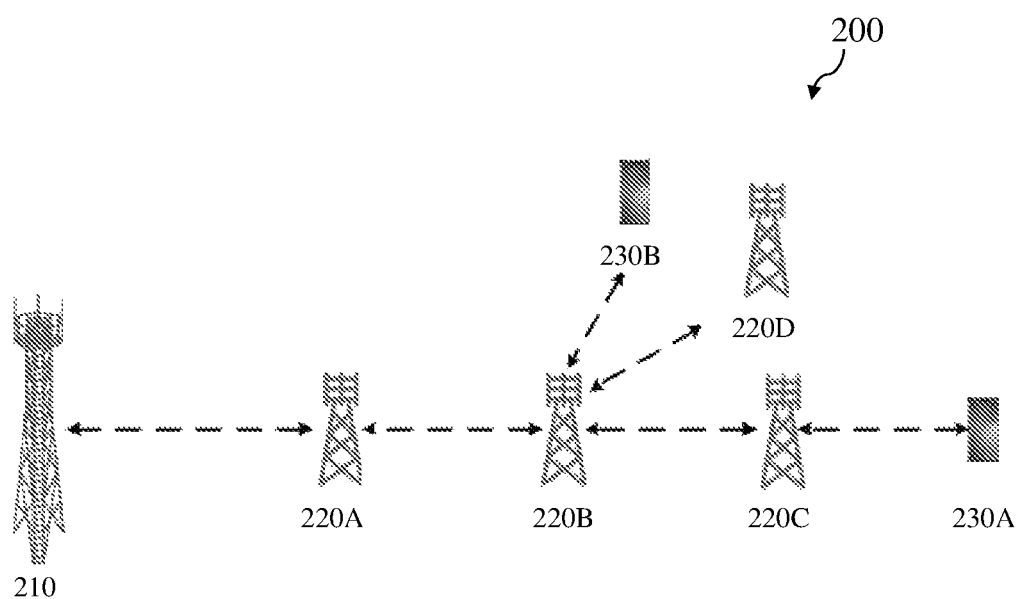
FIG. 2 illustrates a schematic wireless communication system according to some embodiments of the present disclosure.

FIG. 2 illustrates a wireless communication system 200 according to some embodiments of the present disclosure.

Referring to FIG. 2, the wireless communication system 200 can include a Donor node (e.g., IAB Donor 210), some IAB nodes (e.g., IAB node 220A, IAB node 220B, IAB node 220C, and IAB node 220D), and some UEs (e.g., UE 230A and UE 230B). Although merely one Donor node is illustrated in FIG. 2 for simplicity, it is contemplated that wireless communication system 200 may include more Donor node(s) in some other embodiments of the present disclosure. Similarly, although merely four IAB nodes are illustrated in FIG. 2 for simplicity, it is contemplated that wireless communication system 200 may include more or fewer IAB nodes in some other embodiments of the present disclosure. Although merely two UEs are illustrated in FIG. 2 for simplicity, it is contemplated that wireless communication system 200 may include more or fewer UEs in some other embodiments of the present disclosure.

IAB node 220A can be directly connected to IAB Donor 210. IAB node 220B can reach IAB Donor 210 by hopping through IAB node 220A. IAB node 220A is a parent IAB node of IAB node 220B. In other words, IAB node 220B may be a child IAB node of IAB node 220A.

IAB node 220C and IAB node 220D can reach IAB Donor 210 by hopping through IAB node 220B and IAB node 220A. IAB node 220A and IAB node 220B may be upstream IAB nodes of IAB node 220C and IAB node 220D, and IAB node 220B may be a parent IAB node of IAB node 220C and IAB node 220D. IAB node 220B, IAB node 220C, IAB node 220D may be downstream IAB nodes of IAB node 220A.

UE 230A can be directly connected to IAB node 220C, and UE 230B can be directly connected to IAB node 220B. In other words, UE 230A and UE 230B may be served by IAB node 220C and IAB node 220B, respectively. IAB node 220C, IAB node 220D, UE 230A, and UE 230B may be downstream nodes of IAB node 220B. IAB node 220C, IAB node 220D, and UE 230B may be child nodes of IAB node 220B. The radio link between IAB node 220B and IAB node 220C, the radio link between IAB node 220B and IAB node 220D, and the radio link between IAB node 220B and UE 230B are referred to as downstream links of the IAB node 220B.

Each of IAB node 220A, IAB node 220B, IAB node 220C, and IAB node 220D may be directly connected to one or more UE(s) in accordance with some other embodiments of the present disclosure.

Each of IAB node 220A, IAB node 220B, IAB node 220C, and IAB node 220D may be directly connected to one or more IAB node(s) in accordance with some other embodiments of the present disclosure.

Figure 3:
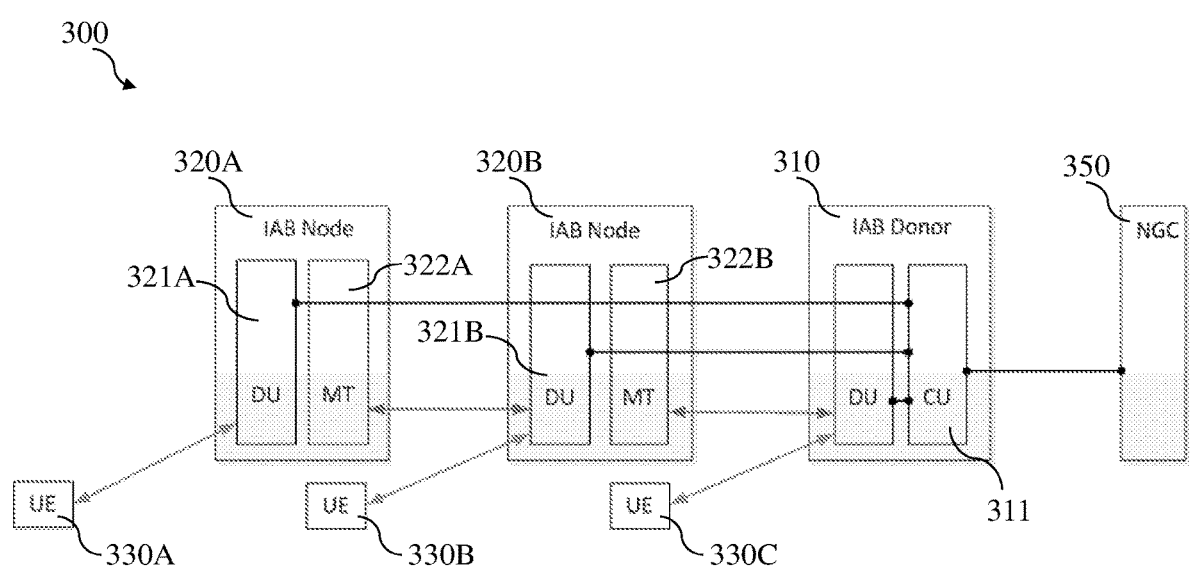
FIG. 3 illustrates a schematic wireless communication system according to some embodiments of the present disclosure.

FIG. 3 illustrates a wireless communication system 300 according to some embodiments of the present disclosure.

Referring to FIG. 3, the wireless communication system 300 may include IAB donor 310, IAB node 320A, IAB node 320B, UE 330A, UE 330B, UE 330C and a Next-Generation Core (NGC) 350.

Each of the IAB node 320A and IAB node 320B may include a Distributed Unit (DU) and a Mobile Termination (MT). In the context of this disclosure, MT is referred to as a function resided in an IAB node that terminates the radio interface layers of the backhaul Uu interface toward an IAB donor or other IAB nodes. The IAB nodes may be connected to an upstream IAB node or a BS (e.g., an IAB donor) via the MT function. The IAB nodes may be connected to UEs and a downstream IAB node via the DU.

IAB node 320A may be connected to an upstream IAB node 320B via MT 322A function. IAB node 320A may be connected to UE 330A via the DU 321A. IAB node 320B may be connected to an upstream IAB node or IAB donor 310 via MT 322B function. IAB node 320B may be connected to UE 330B via DU 321B. IAB node 320B may be connected to downstream IAB node 320A via DU 321B.

Still referring to FIG. 3, the BS (e.g., IAB donor 310) may include at least one DU to support UEs and MTs of downstream IAB nodes. One DU of a BS can support at least one cell. One cell can be supported by only one DU of a BS or DU of an IAB node.

A Central Unit (CU) 311 included in the IAB donor 310 controls the DUs of all IAB nodes (e.g., IAB node 320A and IAB node 320B) and the DU resided in the IAB donor 310. The DU(s) and the CU of an IAB donor may be co-located or may be located in different positions. The DU(s) and the CU of the IAB donor are connected via F1 interface. In other words, the F1 interface provides a means for interconnecting the CU and the DU(s) of an IAB donor. The F1 Application Protocol (F1AP) supports the functions of the F1 interface by certain F1AP signaling procedures.

In some embodiments of the present disclosure, each of the DU of the IAB donor 310, IAB node 320A and IAB node 320B may host adaptation layer, Radio Link Control (RLC) layer, Medium Access Control (MAC) layer and Physical layer (PHY). The adaptation layer may be configured by the CU of a BS. The adaptation layer performs many functions including routing and bearer mapping (e.g., mapping of backhaul RLC channels), and may include a Transmit (TX) component and a Receive (RX) part.

Referring back to FIG. 2, the IAB nodes (e.g., IAB node 220A, IAB node 220B, IAB node 220C, and IAB node 220D) may include respective MTs and DUs (not illustrated in FIG. 2), and the IAB Donor 210 may include at least one DU and a CU (not illustrated in FIG. 2).

Still referring to FIG. 2, link capacity of the downlink between IAB node 220A and IAB node 220B may be relatively greater than the link capacity of the downlink between IAB node 220B and each of its child nodes (e.g., IAB node 220C, IAB node 220D, and UE 230B). In this scenario, the ingress data rate into IAB node 220B scheduled by IAB node 220A may be relatively higher than the egress data rate out of IAB node 220B scheduled by IAB node 220B to its child nodes. This may result in downlink data congestion at IAB node 220B, and may cause packet retransmission, or even packet being discarded, under some circumstances. Various flow control techniques have been developed to address this issue. In data communications, flow control may be used to manage data transmission rate between two nodes to control or relieve congestion.

An end-to-end follow control technique can be used to relieve congestion. In such solution, if congestion happens at a communication device, the communication device may report its congestion status to the BS to which the communication device is connected. After receiving the congestion status report, the BS may alleviate the congestion at the communication device by, for example, allocating more resources to the communication device.

A hop-by-hop follow control technique can be used to relieve congestion. In such solution, if congestion happens at a communication device, the communication device may report the congestion status to its parent node (e.g., another upstream communication device or a BS) and its child nodes (e.g., another downstream communication device or an UE).

After receiving the congestion status report, the parent node may try to resolve this issue by, for example, transmitting data to the communication device (which is undergoing congestion) at a relatively lower data rate, or transmitting the received congestion status report to the BS. After receiving the congestion status report, the child nodes of the communication device (which is undergoing congestion) may, for example, schedule a relatively faster data egress rate so as to alleviate or mitigate the congestion at the communication device (which is undergoing congestion).

Figure 4:
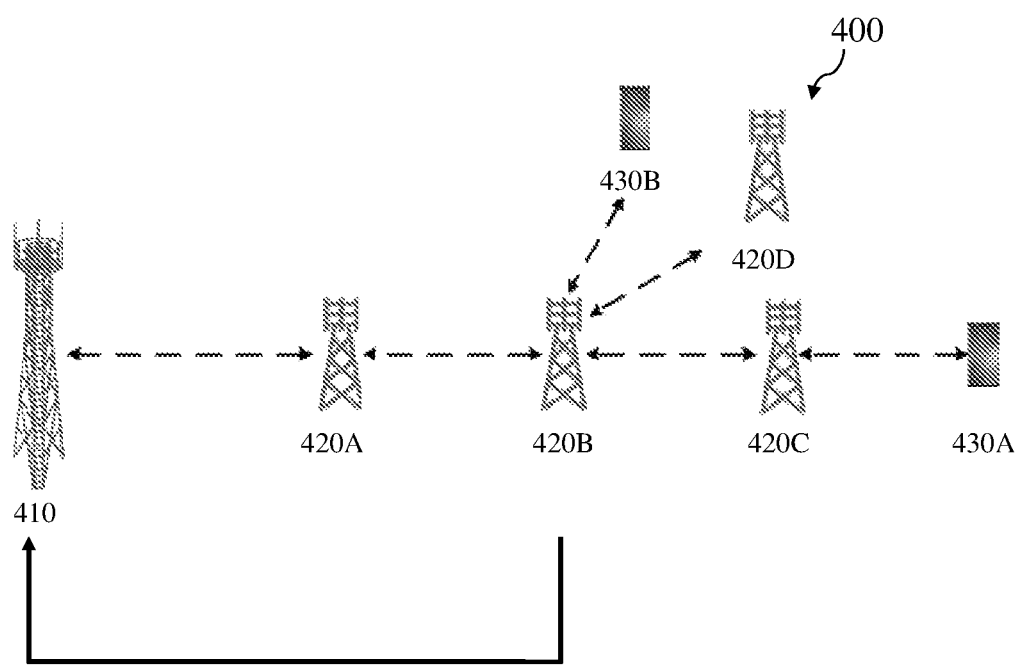
FIG. 4 illustrates a schematic wireless communication system according to some embodiments of the present disclosure.

FIG. 4 illustrates a wireless communication system 400 according to some embodiments of the present disclosure.

In FIG. 4, communication devices 420A, 420B, 420C and 420D are accessing BS 410, and UE 430A is connected to communication device 420C, and UE 430B is connected to communication device 420B. For example, the communication device 420A may function as IAB node 220A shown in FIG. 2, the communication device 420B may function as IAB node 220B shown in FIG. 2, the communication device 420C may function as IAB node 220C shown in FIG. 2, the communication device 420D may function as IAB node 220D shown in FIG. 2, and the BS 410 may function as IAB donor 210 shown in FIG. 2.

An end-to-end follow control technique can be used to control congestion in the wireless communication system 400. For example, as shown in FIG. 4, when congestion occurs at the communication device 420B, the communication device 420B may transmit a congestion indication to the BS 410. In other words, the communication device 420B may directly transmit a congestion indication to the BS 410 without relaying by the communication device 420A. After receiving the congestion indication, the BS may alleviate the congestion at the communication device by, for example, allocating more resources to the communication device.

For example, as shown in FIG. 4, when congestion occurs at the communication device 420B toward the downstream child node 420C, the communication device 420B may directly transmit a congestion indication to the BS 410. Subsequent to the receipt of the congestion indication from the communication device 420B, the BS 410 may handle the congestion problem. For example, more resource(s) may be allocated to the communication device 420B.

Figure 5:
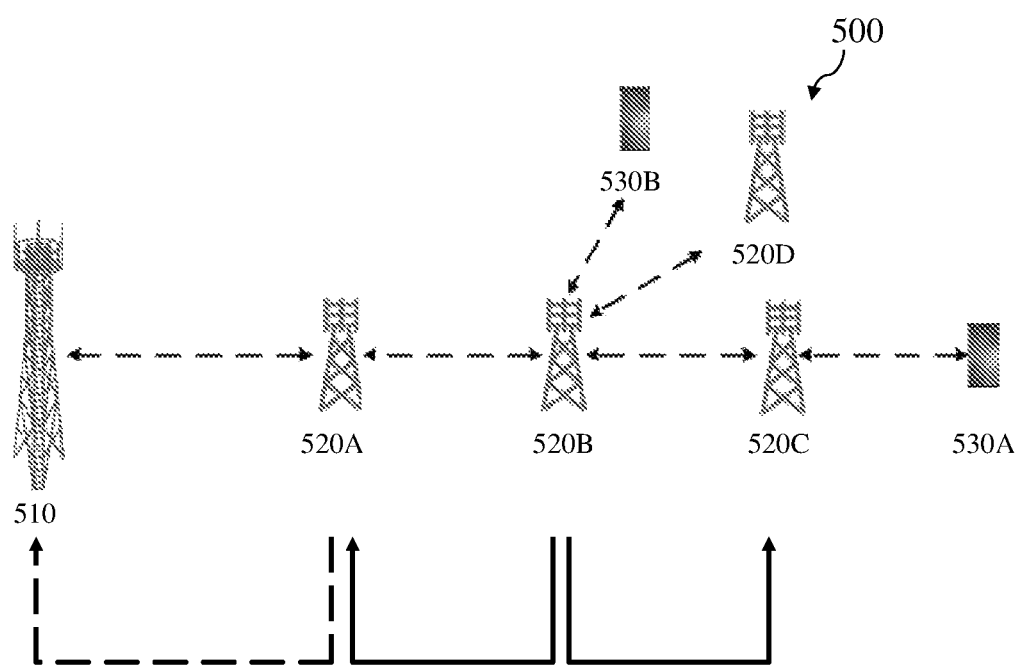
FIG. 5 illustrates a schematic wireless communication system according to some embodiments of the present disclosure.

FIG. 5 illustrates a wireless communication system 500 according to some embodiments of the present disclosure. In FIG. 5, communication devices 520A, 520B, 520C and 520D are accessing BS 510, and UE 530A is connected to communication device 520C, and UE 530B is connected to communication device 520B. For example, the communication device 520A may function as IAB node 220A shown in FIG. 2, the communication device 520B may function as IAB node 220B shown in FIG. 2, the communication device 520C may function as IAB node 220C shown in FIG. 2, the communication device 520D may function as IAB node 220D shown in FIG. 2, and the BS 510 may function as IAB donor 210 shown in FIG. 2.

A hop-by-hop follow control technique can be used to control congestion in the wireless communication system 500. For example, as shown in FIG. 5, when congestion occurs at the communication device 520B, the communication device 520B may transmit a congestion indication to the parent node (e.g., communication device 520A) of the communication device 520B. The communication device 520A may transmit the received congestion indication to the BS 510 (denoted by a dotted line). The communication device 520A may not transmit the received congestion indication to the BS 510. The communication device 520B may transmit a congestion indication to the child node (e.g., communication device 520C) of the communication device 520B.

Embodiments of the present disclosure propose technical solutions for transmitting a congestion indication, which can facilitate flow control in the new generation communication systems, such as 5G communication systems. The proposed technical solutions can be applied to various flow control techniques, such as the end-to-end and hop-by-hop follow control techniques as described above. More details on the embodiments of the present disclosure will be illustrated in the following text in combination with the appended drawings.

Figure 6:
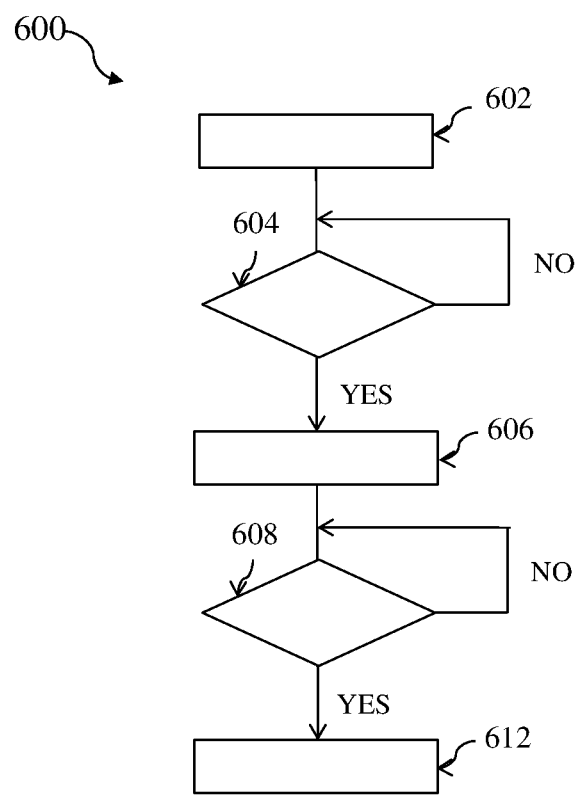
FIG. 6 illustrates an exemplary method of congestion indication according to some embodiments of the present disclosure.

FIG. 6 illustrates an exemplary method 600 of congestion indication according to some embodiments of the present disclosure.

At step 602, a communication device, which may include the IAB node 220B shown in FIG. 2, the communication device 420B shown in FIG. 4, or the communication device 520B shown in FIG. 5, can receive a configuration message including a threshold for triggering a congestion indication report from a BS, which may include the IAB donor 210 shown in FIG. 2, the BS 410 shown in FIG. 4, or the BS 510 shown in FIG. 5.

In some embodiments of the present disclosure, the threshold may be configured per downstream link of the communication device.

For example, referring back to FIG. 2, the IAB node 220B may have three downstream links, e.g., the radio link between IAB node 220B and IAB node 220C, the radio link between IAB node 220B and IAB node 220D, and the radio link between IAB node 220B and UE 230B. The IAB donor 210 may configure a respective threshold for each of the three downstream links. One threshold configured for one downstream link may be different from another threshold configured for another downstream link. One threshold configured for one downstream link may be the same to another threshold configured for another downstream link.

In some embodiments of the present disclosure, the threshold may be configured to be applied to all downstream links of the communication device. For example, referring to FIG. 2, the IAB donor 210 may configure one uniform or identical threshold for all of the three downstream links of the IAB node 220B.

Referring to FIG. 6, at step 604, the communication device may determine whether the occupied buffer size of the communication device is equal to or greater than the threshold. If it is determined that the occupied buffer size of the communication device is equal to or greater than the threshold, the communication device may transmit a congestion indication at step 606 to the BS, to a parent node of the communication device, to a child node of the communication device, to both the BS and the parent node of the communication device, to both the parent node of the communication device and the child node of the communication device, to both the BS and the child node of the communication device, or to all the BS, the parent node of the communication device and the child node of the communication device, depending on which flow control technique is employed.

For example, referring back to FIG. 4, the communication device 420B may determine that the occupied buffer size of the communication device 420B is equal to or greater than the threshold configured by the BS 410. Then, the communication device 420B may transmit a congestion indication to the BS 410. In some embodiments of the present disclosure, the congestion indication may be transmitted to the BS via RRC signaling or F1AP signaling.

For example, referring to FIG. 5, the communication device 520B may determine that the occupied buffer size of the communication device 520B is equal to or greater than the threshold configured by the BS 510. Then, the communication device 520B may transmit a congestion indication to the parent node (e.g., communication device 520A) of the communication device 520B. The communication device 520B may transmit a congestion indication to the child node (e.g., communication device 520C) of the communication device 520B which is experiencing the congestion.

In some embodiments of the present disclosure, the congestion indication may be transmitted to the parent node, the child node, or both the parent node and the child node, via a MAC unit or a message in adaptation layer.

In some embodiments of the present disclosure, the congestion indication may be included in a MAC Control Element (CE) of a MAC Protocol Data Unit (PDU). In these embodiments, information or data may be included in the MAC header of the MAC PDU to indicate the MAC CE including the congestion indication. For example, in the MAC header of a MAC PDU, there may be one corresponding field (e.g., Logical Channel ID (LCID) field) indicating the type of each MAC CE. A dedicated LCID value may be assigned to indicate the MAC CE including the congestion indication.

In some embodiments of the present disclosure, in the case that the congestion indication is transmitted to the child node via the MAC PDU, the header of the MAC PDU may include the dedicated LCID. In some embodiments of the present disclosure, the MAC CE corresponding to the dedicated LCID may be empty. The child node would know which MAC CE is for congestion indication based on the dedicated LCID.

The formats of the MAC CE transmitted to the parent node will be described in detail in the following text with respect to FIGS. 7A-7D.

Referring back to FIG. 6, in some embodiments of the present disclosure, the congestion indication may include the identities of the child nodes of the communication device which are experiencing congestion. The identity of a node may be a cell identity of the node (e.g., a physical cell identity (PCI)), an identity of a DU of the node, a Cell Radio Network Temporary Identifier (C-RNTI), or any other ID(s) that can be used to identify the node.

For example, referring back to FIG. 2, the IAB node 220B may include a corresponding buffer for each downstream link. If it is determined that the occupied amount of the buffer for the radio link between IAB node 220B and IAB node 220C is equal to or greater than the threshold configured by the IAB donor 210, which may be determined that IAB node 220C is experiencing congestion, the congestion indication to be transmitted by the IAB node 220B may include an identity of IAB node 220C.

Similarly, if it is determined that the occupied amount of the buffer for the radio link between IAB node 220B and UE 230B is equal to or greater than the threshold configured by the IAB donor 210, which may be determined that UE 230B is experiencing congestion, the congestion indication to be transmitted by the IAB node 220B may include an identity of UE 230B.

Referring to FIG. 6, in some embodiments of the present disclosure, the congestion indication may include the occupied buffer size of the communication device. In some embodiments, the occupied buffer size of the communication device may be the number of bits, bytes, or the like occupied by data in an RLC transmission buffer of the communication device. In some embodiments, the RLC transmission buffer may refer to the RLC transmission buffer in the DU of the communication device.

For example, referring back to FIG. 3, the occupied buffer size of the IAB node 320A may include the number of bytes occupied by data in an RLC transmission buffer in the DU 321A of the IAB node 320A.

Referring to FIG. 6, in some embodiments of the present disclosure, prior to transmitting the congestion indication at step 606, the communication device may transmit a message including a total buffer size of the communication device. In some embodiments, the total buffer size of the communication device is transmitted during a setup procedure of the communication device. In some embodiments, the total buffer size of the communication device is included in the capability Information Element (IE) of the communication device.

For example, referring back to FIG. 4, the communication device 420B may transmit the total buffer size of the communication device 420B to the BS 410.

For example, referring to FIG. 5, the communication device 520B may transmit the total buffer size of the communication device 520B to its parent node (e.g., communication device 520A).

After receiving the congestion indication from the communication device (e.g., the communication device 420B in FIG. 4 or the communication device 520B in FIG. 5), the BS (e.g., the BS 410 in FIG. 4) or the parent node (e.g., the communication device 520A in FIG. 5) of the communication device may determine the remaining buffer size of the communication device by subtracting the occupied buffer size of the communication device from the total buffer size of the communication device.

It is beneficial to know the remaining buffer size since it may indicate whether the buffer at the communication device will overflow or not, and the BS may determine whether the Quality of Service (QoS) requirement of a certain flow will be met or not.

Referring to FIG. 6, in some embodiments of the present disclosure, the communication device may determine the remaining buffer size by subtracting the occupied buffer size of the communication device from the total buffer size of the communication device. In these embodiments, the congestion indication may include the remaining buffer size of the communication device. In these embodiments, total buffer size of the communication device may not be required to be transmitted beforehand.

In some embodiments of the present disclosure, the total buffer size of the communication device may be the size of the RLC transmission buffer of the communication device. In some embodiments, the RLC transmission buffer may refer to the RLC transmission buffer in the DU of the communication device.

In some embodiments of the present disclosure, the total buffer size of the communication device may be a sum of the size of the RLC transmission buffer of the communication device and the size of an RLC reception buffer of the communication device. In some embodiments, the RLC transmission buffer may refer to the RLC transmission buffer in the DU of the communication device, and the RLC reception buffer may refer to the RLC reception buffer in an MT of the communication device.

Still referring to FIG. 6, the communication device may determine, at step 608, whether the content of the congestion indication is changed or not. If it is determined that the content of the congestion indication is changed, the communication device may transmit, at step 612, the congestion indication to the BS, to a parent node of the communication device, to a child node of the communication device, to both the BS and the parent node of the communication device, to both the parent node of the communication device and the child node of the communication device, to both the BS and the child node of the communication device, or to all the BS, the parent node of the communication device and the child node of the communication device, depending on which flow control technique is employed.

In some embodiments of the present disclosure, the change of the content of the congestion indication may include a change of the congestion state of a child node of the communication device.

For example, referring back to FIG. 2, the IAB node 220B may transmit a relatively earlier congestion indication including the identity of the IAB node 220C if it determines that the occupied amount of the buffer for the radio link between the IAB node 220B and the IAB node 220C is equal to or greater than a corresponding threshold configured by the IAB donor 210.

After a period of time, the congestion on the radio link between the IAB node 220B and the IAB node 220C may be solved. That is, the congestion state of the IAB node 220C may be changed from congestion to non-congestion. The IAB node 220B may then transmit an updated congestion indication.

In another example, the relatively earlier congestion indication may not include the identity of the IAB node 220C. However, after a period of time, the congestion state of the IAB node 220C may be changed from non-congestion to congestion. For example, the occupied amount of the buffer for the radio link between the IAB node 220B and the IAB node 220C may now be equal to or greater than the corresponding threshold configured by the IAB donor 210. The IAB node 220B may then transmit an updated congestion indication.

Referring to FIG. 4, the communication device 420B may transmit the updated congestion indication to the BS 410.

Referring to FIG. 5, the communication device 520B may transmit the updated congestion indication to its parent node (e.g., communication device 520A) and/or relevant child nodes (e.g., communication device 520C).

Referring to FIG. 6, in some embodiments of the present disclosure, in response to transmitting the congestion indication at step 606, the communication device may start a timer (T1). Upon the expiry of the Timer T1, the communication device may determine whether the congestion at the communication device is solved; and if not, the communication device may transmit a congestion indication to the BS, to a parent node of the communication device, to a child node of the communication device, to both the BS and the parent node of the communication device, to both the parent node of the communication device and the child node of the communication device, to both the BS and the child node of the communication device, or to all the BS, the parent node of the communication device and the child node of the communication device, depending on which flow control technique is employed. For example, the communication device may determine that the congestion at the communication device is not solved if the occupied buffer size of the communication device is equal to or greater than a threshold configured by the BS.

FIGS. 7A-7D illustrate exemplary formats of MAC CE according to embodiments of the present disclosure.

As described above, in some embodiments of the present disclosure, the congestion indication may include an identity of a child node of a communication device which is experiencing congestion. In some embodiments of the present disclosure, the congestion indication may include buffer size information of the communication device associated with the child node (e.g., the occupied buffer size, the remaining buffer size, or both). The MAC CE may be used to carry the congestion indication.

Although, the node identity shown in FIGS. 7A-7D includes 8 bits for simplicity, it is contemplated that the node identity may include more or less bits in some other embodiments of the present disclosure. Although, for simplicity, the buffer size information in FIGS. 7C and 7D includes 4 bits, it is contemplated that the buffer size information may include more or fewer bits in some other embodiments of the present disclosure. In some other embodiments of the present disclosure, the exemplary formats of MAC CE shown in FIGS. 7A-7D can be varied or changed of interest.

Figure 7A:
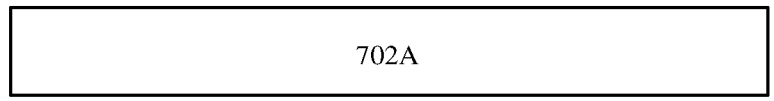
FIG. 7A illustrates an exemplary MAC control element according to some embodiments of the present disclosure.

FIG. 7A illustrates an exemplary MAC CE 700A according to some embodiments of the present disclosure. The MAC CE 700A may be used to indicate an identity of only one child node of a communication device which is experiencing congestion. Specifically, as shown in FIG. 7A, the MAC CE 700A is octet aligned and may include field 702A. Thus, the 8-bit field 702A is used to indicate the node identity.

For example, referring back to FIG. 5, the communication device 520B may transmit to its parent node (e.g., communication device 520A) a MAC CE including the identity of one of its child nodes which is experiencing congestion (e.g., communication device 520C). In the case that there is more than one child node of the communication device 520B which is experiencing congestion, for example, in addition to communication device 520C, UE 530B is also experiencing congestion, the communication device 520B may transmit an additional MAC CE including the identity of UE 530B to the communication device 520A in a different MAC PDU.

FIG. 7B illustrates an exemplary MAC CE 700B according to some embodiments of the present disclosure. The MAC CE 700B may be used to indicate an identity of each of the child nodes of a communication device which are experiencing congestion.

Specifically, as shown in FIG. 7B, the MAC CE 700B is octet aligned and includes 4 bytes, the first, second, third, and fourth bytes being respectively referred to as "Oct 1", "Oct 2", "Oct 3", "Oct 4" in the figure.

The MAC CE 700B may include field 704B, field 702B-1, field 702B-2, field 702B-3, and field 706B. Field 704B may include 4 bits, each of the field 702B-1, field 702B-2, and field 702B-3 may include 8 bits, and field 706B may include 4 bits. Thus, the field 702B-1 occupies 4 bits of byte "Oct 1" and 4 bits of byte "Oct 2"; the field 702B-2 occupies 4 bits of byte "Oct 2" and 4 bits of byte "Oct 3"; the field 702B-3 occupies 4 bits of byte "Oct 3" and 4 bits of byte "Oct 4".

Field 702B-1, field 702B-2, and field 702B-3 may be used to indicate respective identities of the child nodes which are experiencing congestion, field 704B may be used to indicate the number of node identities included in the MAC CE 700B, field 706B may be reserved for future use and may be set to a value of "0". The value of the number of node identities included in the MAC CE 700B may be equal to or greater than "0". In the case of FIG. 7B, the MAC CE 700B includes three node identities, and field 704B may thus be set to "0011" (equal to the value of "3" in decimal format).

In some embodiments of the present disclosure, field 704B may be set to "0000" (equal to the value of "0" in decimal format). This suggests that all downstream links of the communication device are not in congestion. In these embodiments, the MAC CE 700B may not include any node identities. That is, the MAC CE 700B may not include field 702B-1, field 702B-2, and field 702B-3.

Although FIG. 7B shows that the field, i.e., field 704B, used to indicate the number of node identities includes 4 bits for simplicity, it is contemplated that this field may include more or fewer bits in some other embodiments of the present disclosure. Although FIG. 7B shows that MAC CE 700B includes three node identities for simplicity, it is contemplated that MAC CE 700B may include more or fewer node identities in some other embodiments of the present disclosure. Although FIG. 7B shows that MAC CE 700B starts with field 704B followed by field 702B-1, field 702B-2, field 702B-3, and field 706B for explanation, MAC CE 700B may include other formats in some other embodiments of the subject application.

For example, referring back to FIG. 5, assuming that in addition to the communication device 520C, UE 530B and the communication device 520D are also experiencing congestion (not shown), the communication device 520B may transmit to its parent node (e.g., communication device 520A) a MAC CE including an identity of each of these three child nodes which are experiencing congestion (i.e., the communication device 520C, the communication device 520D, and UE 530B).

Figure 7C:
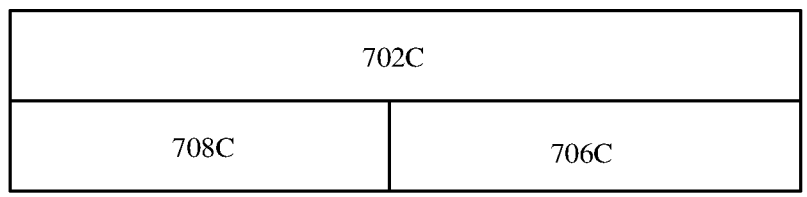
FIG. 7C illustrates an exemplary MAC control element according to some embodiments of the present disclosure.

FIG. 7C illustrates an exemplary MAC CE 700C according to some embodiments of the present disclosure. Similarly to FIG. 7A, the MAC CE 700C may be used to indicate an identity of only one child node of a communication device which is experiencing congestion. However, the MAC CE 700C may further include the buffer size information of the communication device associated with the child node identified therein.

Specifically, as shown in FIG. 7C, the MAC CE 700C is octet aligned and includes 2 bytes, the first and second bytes being respectively referred to as "Oct 1" and "Oct 2" in the figure.

The MAC CE 700C may include field 702C, field 708C, and field 706C. Field 702C may include 8 bits, field 708C may include 4 bits, and field 706C may include 4 bits. Thus, the field 702 occupies all 8 bits of byte "Oct 1"; the field 708C occupies 4 bits of byte "Oct 2"; and field 706C occupies 4 bits of byte "Oct 2".

Field 702C may be used to indicate the node identity, field 708C may be used to indicate the buffer size information, and field 706C may be reserved for future use and may be set to a value of "0".

The buffer size information may include an occupied buffer size of the communication device associated with the child node, a remaining buffer size of the communication device associated with the child node, or both.

In the case that the buffer size information includes both the occupied buffer size and the remaining buffer size, the field 708C may include two sub-fields (not shown). Each of the two sub-fields may include 2 bits, and may be used to indicate a respective one of the occupied buffer size and the remaining buffer size. Although, for simplicity, each of the two sub-fields of field 708C includes 2 bits, it is contemplated that the sub-fields may include more or fewer bits in some other embodiments of the present disclosure.

Although FIG. 7C shows that MAC CE 700C starts with field 702C followed by field 708C and field 706C, the MAC CE 700C may include other format(s) in accordance with some other embodiments of the subject application.

For example, referring to FIG. 5, the communication device 520B may transmit to its parent node (e.g., communication device 520A) a MAC CE including the identity of one of its child nodes which is experiencing congestion (e.g., communication device 520C). The MAC CE also includes the buffer size information of the communication device 520B associated with the communication device 520C. The buffer size information may include an occupied buffer size of the communication device 520B associated with the communication device 520C, the remaining buffer size of the communication device 520B associated with the communication device 520C, or both.

In the case that there is more than one child node of the communication device 520B which is experiencing congestion, for example, in addition to communication device 520C, UE 530B is also experiencing congestion, the communication device 520B may transmit an additional MAC CE including the identity of UE 530B to the communication device 520A and the corresponding buffer size information in a different MAC PDU.

FIG. 7D illustrates an exemplary MAC CE 700D according to some embodiments of the present disclosure. Similarly to FIG. 7B, the MAC CE 700D may be used to indicate an identity of each of the child nodes of a communication device which are experiencing congestion. However, the MAC CE 700D may further include respective buffer size information associated with each of the child nodes.

Specifically, as shown in FIG. 7D, the MAC CE 700D is octet aligned and includes 4 bytes, the first, second, third, and fourth bytes being respectively referred to as "Oct 1", "Oct 2", "Oct 3", "Oct 4" in the figure.

The MAC CE 700D may include field 704D, field 702D-1, field 708D-1, field 702D-2, field 708D-2, and field 706D. Field 704D may include 4 bits, each of the field 702D-1 and field 702D-2 may include 8 bits, each of the field 708D-1 and field 708D-2 may include 4 bits, and field 706D may include 4 bits. Thus, the field 704D occupies 4 bits of byte "Oct 1"; the field 702D-1 occupies 4 bits of byte "Oct 1" and 4 bits of byte "Oct 2"; the field 708D-1 occupies 4 bits of byte "Oct 2"; the field 702D-2 occupies all 8 bits of byte "Oct 3"; the field 708D-2 occupies 4 bits of byte "Oct 4"; and the field 706D occupies 4 bits of byte "Oct 4".

Field 702D-1 and field 702D-2 may be used to indicate respective identities of the child nodes which are experiencing congestion, field 708D-1 and field 708D-2 may be used to indicate respective buffer size information associated with the child nodes, field 704D may be used to indicate the number of node identities included in the MAC CE 700D, and field 706D may be reserved for future use and may be set to a value of "0". In the case of FIG. 7D, the MAC CE 700D includes two node identities, and field 704D may thus be set to "0010" (equal to the value of "2" in decimal format).

Similar to field 704B in FIG. 7B, field 704D may be set to "0000" (equal to the value of "0" in decimal format). This suggests that all downstream links of the communication device are not in congestion. In these embodiments, the MAC CE 700D may not include any node identities. That is, the MAC CE 700D may not include field 702D-1 and field 702D-2.

The buffer size information indicated in each of the field 708D-1 and field 708D-2 may include respective occupied buffer size, respective remaining buffer size, or both. In the case that the buffer size information includes both the occupied buffer size and the remaining buffer size, similar to field 708C in FIG. 7C, each of the field 708D-1 and field 708D-2 may include two sub-fields (not shown), which may be used to indicate a respective one of the occupied buffer size and the remaining buffer size.

Although FIG. 7D shows that the field, i.e., field 704D, used to indicate the number of node identities includes 4 bits for simplicity, it is contemplated that this field may include more or fewer bits in some other embodiments of the present disclosure. Although FIG. 7D shows that MAC CE 700D includes two node identities for simplicity, it is contemplated that MAC CE 700D may include more or fewer node identities in some other embodiments of the present disclosure. Although FIG. 7D shows that MAC CE 700D starts with field 704D followed by field 702D-1, field 708D-1, field 702D-2, field 708D-2, and field 706D, the MAC CE 700D may include other format(s) in accordance with some other embodiments of the subject application.

For example, referring back to FIG. 5, assuming that in addition to the communication device 520C, UE 530B is also experiencing congestion (not shown), the communication device 520B may transmit to its parent node (e.g., communication device 520A) a MAC CE including an identity of each of these two child nodes which are experiencing congestion (i.e., the communication device 520C and UE 530B). For example, in the MAC CE, field 704D may be set to "0010", field 702D-1 may include the identity of the communication device 520C, field 708D-1 may include the buffer size information of the communication device 520B associated with the communication device 520C, field 702D-2 may include the identity of the UE 530B, field 708D-2 may include the buffer size information of the communication device 520B associated with the UE 530B, and field 706D may be set to "0000".

Figure 8:
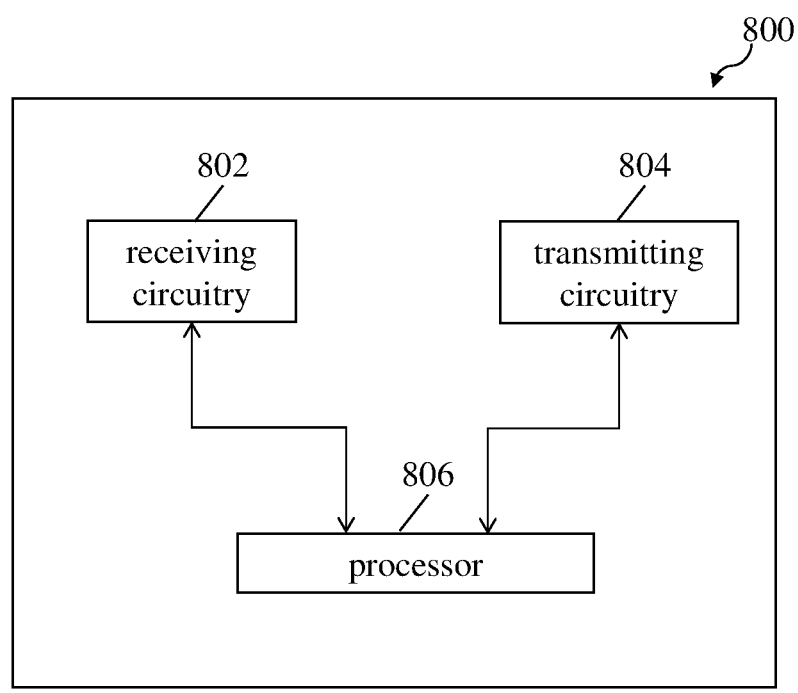
FIG. 8 illustrates an example block diagram of an apparatus according to some embodiments of the present disclosure.

FIG. 8 illustrates an example block diagram of an apparatus 800 according to some embodiments of the present disclosure.

As shown in FIG. 8, the apparatus 800 may include at least one non-transitory computer-readable medium (not illustrated in FIG. 8), a receiving circuitry 802, a transmitting circuitry 804, and a processor 806 coupled to the non-transitory computer-readable medium (not illustrated in FIG. 8), the receiving circuitry 802 and the transmitting circuitry 804. The apparatus 800 may be a BS, a communication device (e.g., an IAB node), or an UE.

Although in this figure, elements such as processor 806, transmitting circuitry 804, and receiving circuitry 802 are described in the singular, the plural is contemplated unless limitation to the singular is explicitly stated. In some embodiments of the present disclosure, the receiving circuitry 802 and the transmitting circuitry 804 are combined into a single device, such as a transceiver. In certain embodiments of the present disclosure, the apparatus 800 may further include an input device, a memory, and/or other components.

In some embodiments of the present disclosure, the non-transitory computer-readable medium may have stored thereon computer-executable instructions to cause a processor to implement the method with respect to the communication device as described above. For example, the computer-executable instructions, when executed, cause the processor 806 interacting with receiving circuitry 802 and transmitting circuitry 804, so as to perform the steps with respect to the IAB nodes depicted in FIGS. 2 and 3 and the communication devices depicted in FIGS. 4-6.

In some embodiments of the present disclosure, the non-transitory computer-readable medium may have stored thereon computer-executable instructions to cause a processor to implement the method with respect to the BS as described above. For example, the computer-executable instructions, when executed, cause the processor 806 interacting with receiving circuitry 802 and transmitting circuitry 804, so as to perform the steps with respect to the IAB donors depicted in FIGS. 2 and 3 and the BSs depicted in FIGS. 4-6.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

The following is what is claimed:

1. A method performed by a user equipment (UE), the method comprising:
    transmitting, from the UE to at least one of a base station and a parent node of the UE and during a setup procedure of the UE, a total buffer size of the UE, wherein the total buffer size of the UE is included in a capability information element for the UE;
    receiving, from the at least one of the base station and the parent node, a configuration message including a threshold to configure the UE; and
    transmitting, from the UE, a congestion indication if an occupied buffer size of the UE is equal to or greater than the threshold, wherein the congestion indication is transmitted via a message in an adaptation layer, the adaptation layer being configured by a central unit of the base station.

2. The method of claim 1, wherein the congestion indication is transmitted to: the base station, or the parent node of the UE, or both.

3. The method of claim 2, wherein if the congestion indication is transmitted via a medium access control unit, the medium access control unit comprises a logical channel identifier to identify a medium access control control element associated with the congestion indication.

4. The method of claim 3, wherein if the congestion indication is transmitted via a medium access control unit to a parent node of the UE, the medium access control unit further comprises a medium access control control element associated with the congestion indication, wherein the medium access control control element associated with the congestion indication comprises an identity of one corresponding child node of the UE which is experiencing congestion.

5. The method of claim 4, wherein each medium access control control element of at least one medium access control control element associated with the congestion indication further comprises a buffer size of the UE associated with the child node, and wherein the buffer size of the UE associated with a child node comprises an occupied buffer size of the UE associated with the child node, a remaining buffer size of the UE associated with the child node, or both.

6. The method of claim 4, wherein:
    the child node of the UE comprises a child UE;
    an identity of a child node comprises one of a physical cell identity, an identity of a distributed unit of the child node, or a cell radio network temporary identifier; or a combination thereof.

7. The method of claim 3, wherein if the congestion indication is transmitted via a medium access control unit to a parent node of the UE, the medium access control control element associated with the congestion indication comprises an identity of each of child nodes of the UE which are experiencing congestion, and a number of identities of the child nodes included in the medium access control control element.

8. The method of claim 7, wherein:
    the medium access control control element associated with the congestion indication further comprises respective buffer size of the UE associated with each of child nodes of the UE which are experiencing congestion;
    the number of identities of the child nodes is equal to or greater than 0;
    or a combination thereof.

9. The method of claim 1, wherein the congestion indication comprises the occupied buffer size of the UE, and wherein the total buffer size is determined by a size of a radio link control transmission buffer in a distributed unit of the UE, or a sum of a size of the radio link control transmission buffer in the distributed unit of the UE and a size of a radio link control reception buffer in a mobile termination of the UE.

10. The method of claim 1, wherein the congestion indication comprises the occupied buffer size of the UE and a remaining buffer size of the UE.

11. The method of claim 10, wherein the remaining buffer size of the UE is determined by the total buffer size of the UE transmitted during the setup procedure of the UE minus the occupied buffer size of the UE.

12. The method of claim 1, further comprising transmitting the congestion indication if a content of the congestion indication is changed, wherein the change of the content of the congestion indication comprises a change of congestion state of a child node of the UE.

13. A method at a user equipment (UE), the method comprising:
    receiving, from a second device and during a setup procedure of the second device, a total buffer size of the second device of the second device, wherein the total buffer size of the second device is included in a capability information element for the UE;

transmitting, to the second device, a configuration message including a threshold to configure a second device; and receiving, from the second device, a congestion indication via a message in an adaptation layer, the adaptation layer being configured by a central unit of a base station.

14. The method of claim 13, wherein if the congestion indication is received via a medium access control unit, the medium access control unit comprises a logical channel identifier to identify a medium access control control element associated with the congestion indication.

15. The method of claim 14, wherein the medium access control unit further comprises a medium access control control element associated with the congestion indication, and wherein the medium access control control element associated with the congestion indication comprises an identity of one corresponding child node of the UE which is experiencing congestion.

16. The method of claim 15, wherein each one medium access control control element associated with the congestion indication further comprises a buffer size of the UE associated with a child node, and wherein the buffer size of the UE associated with a child node comprises an occupied buffer size of the UE associated with the child node, a remaining buffer size of the UE associated with the child node, or both.

17. The method of claim 15, wherein:
a child node of the UE comprises a child UE or a user equipment directly connected to the UE;
an identity of a child node comprises one of a physical cell identity, an identity of a distributed unit of the child node, or a cell radio network temporary identifier; or a combination thereof.

18. The method of claim 14, wherein the medium access control control element associated with the congestion indication comprises an identity of each of child nodes of the UE which are experiencing congestion, and a number of identities of the child nodes included in the medium access control control element, and wherein the number of identities of the child nodes is equal to or greater than 0.

19. A user equipment (UE), comprising:
at least one memory; and
at least one processor coupled with the at least one memory and configured to cause the UE to:
transmit, from the UE to at least one of a base station and a parent node of the UE and during a setup procedure of the UE, a total buffer size of the UE, wherein the total buffer size of the UE is included in a capability information element for the UE;
receive, from the at least one of the base station and the parent node, a configuration message including a threshold to configure the UE; and
transmit a congestion indication if an occupied buffer size of the UE is equal to or greater than the threshold, wherein the congestion indication is transmitted via a message in an adaptation layer, the adaptation layer being configured by a central unit of the base station.

20. A user equipment (UE), comprising:
at least one memory; and
at least one processor coupled with the at least one memory and configured to cause the UE to:
receive, from a second device and during a setup procedure of the second device, a total buffer size of the second device of the second device, wherein the total buffer size of the second device is included in a capability information element for the UE;
transmit, to the second device, a configuration message including a threshold to configure a second device; and
receive, from the second device, a congestion indication via a message in an adaptation layer, the adaptation layer being configured by a central unit of a base station.

* * * * *